United States Patent [19]

Jannière

[11] 4,063,867
[45] Dec. 20, 1977

[54] INJECTION AND BLOWING MACHINE FOR MANUFACTURING HOLLOW BODIES OF PLASTICS MATERIAL

[75] Inventor: Alain Jannière, Le Havre, France
[73] Assignee: Pont-A-Mousson S.A., Nancy, France
[21] Appl. No.: 755,311
[22] Filed: Dec. 29, 1976
[30] Foreign Application Priority Data
Dec. 31, 1975 France ............................... 75.40260
Dec. 8, 1976 France ............................... 76.36972
[51] Int. Cl.$^2$ ........................................... B29D 23/03
[52] U.S. Cl. .................................. 425/526; 425/530; 425/534; 425/540
[58] Field of Search ............ 425/242 B, 387 B, 324 B, 425/DIG. 208, DIG. 209, DIG. 211, DIG. 213, DIG. 215, DIG. 216

[56] References Cited
U.S. PATENT DOCUMENTS

| | | | |
|---|---|---|---|
| 3,599,280 | 8/1971 | Rosenkranz | 425/DIG. 208 |
| 3,850,562 | 11/1974 | Takauchi et al. | 425/DIG. 209 |
| 3,923,441 | 12/1975 | Farrell | 425/DIG. 209 |

*Primary Examiner*—Richard B. Lazarus
*Attorney, Agent, or Firm*—Sughrue, Rothwell, Mion, Zinn and Macpeak

[57] ABSTRACT

Machine for injecting and blowing a plastics material into hollow bodies. It comprises a rotary polygonal-sided turret which carries on each side a set of support members for the plastics material which are made to pass step-by-step to an injection station for injection of a blank and a blowing station for blowing the material into a hollow body in passing through intermediate stations including a transfer station. A rotatable oven structure having sockets rotatable step-by-step about an axis of the oven structure is located adjacent the transfer station for transferring the sets from the turret to the oven structure and, after a complete rotation about the oven structure axis, transferring the sets from the oven structure to the turret. Each turret side and each socket of the oven structure receives a respective one of the sets which is fixed to the turret or oven structure in a removable manner to allow the mentioned transfer. Heating means in the oven structure heat the material supported by the support members, during the rotation of the sockets, for the purpose of subsequently completing a bi-axial drawing of the plastics material at the blowing station.

26 Claims, 27 Drawing Figures

FIG_1

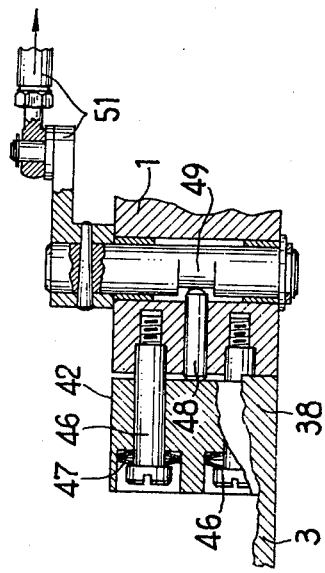
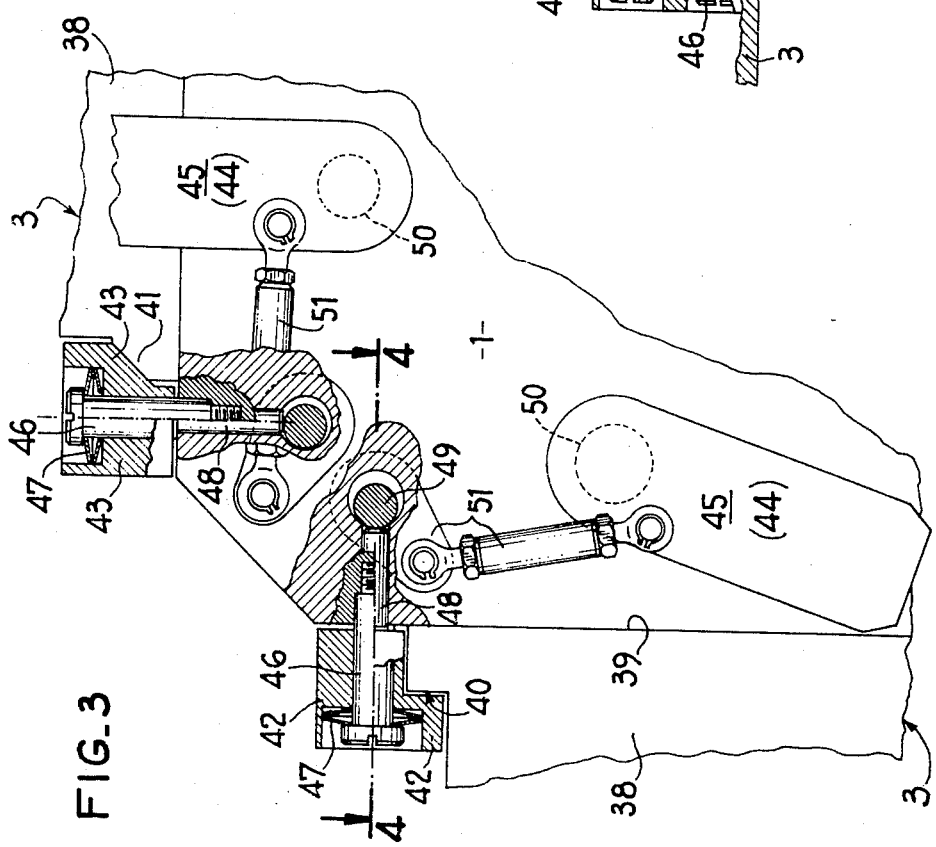

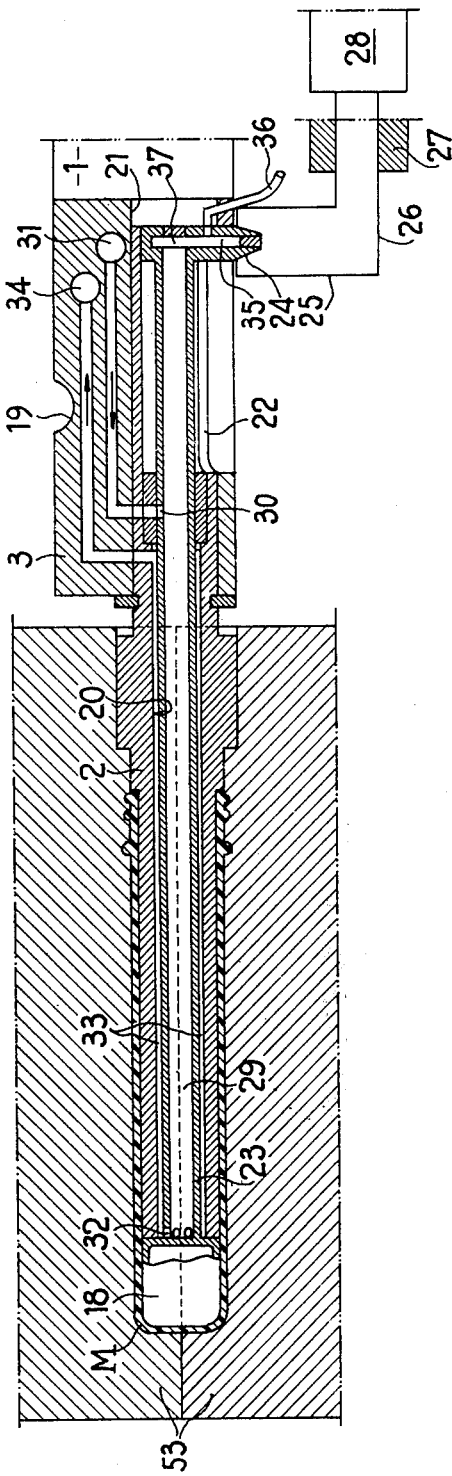
FIG._5
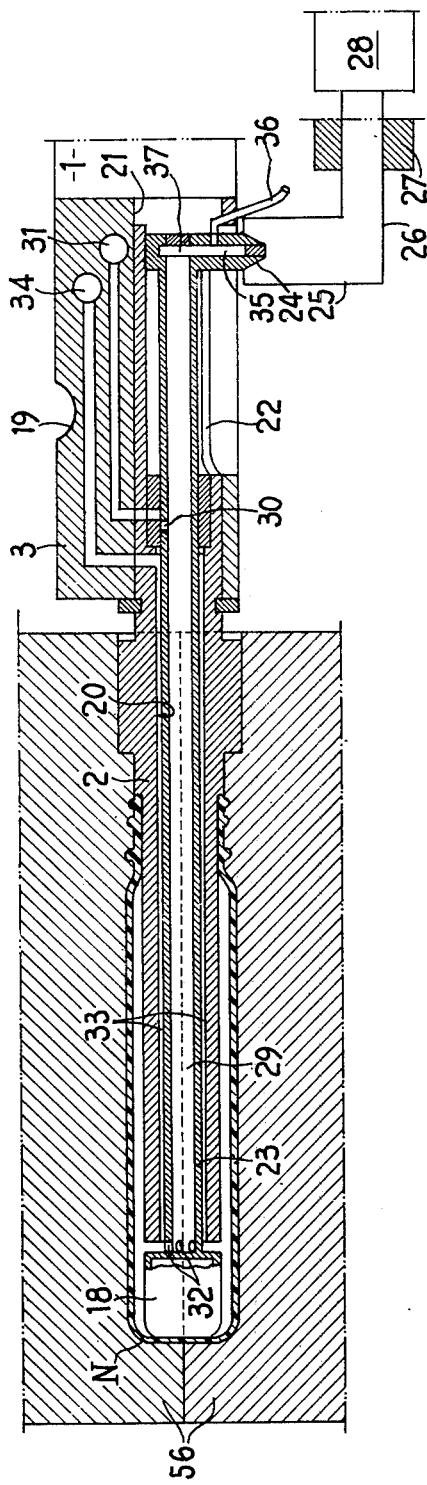
FIG._6

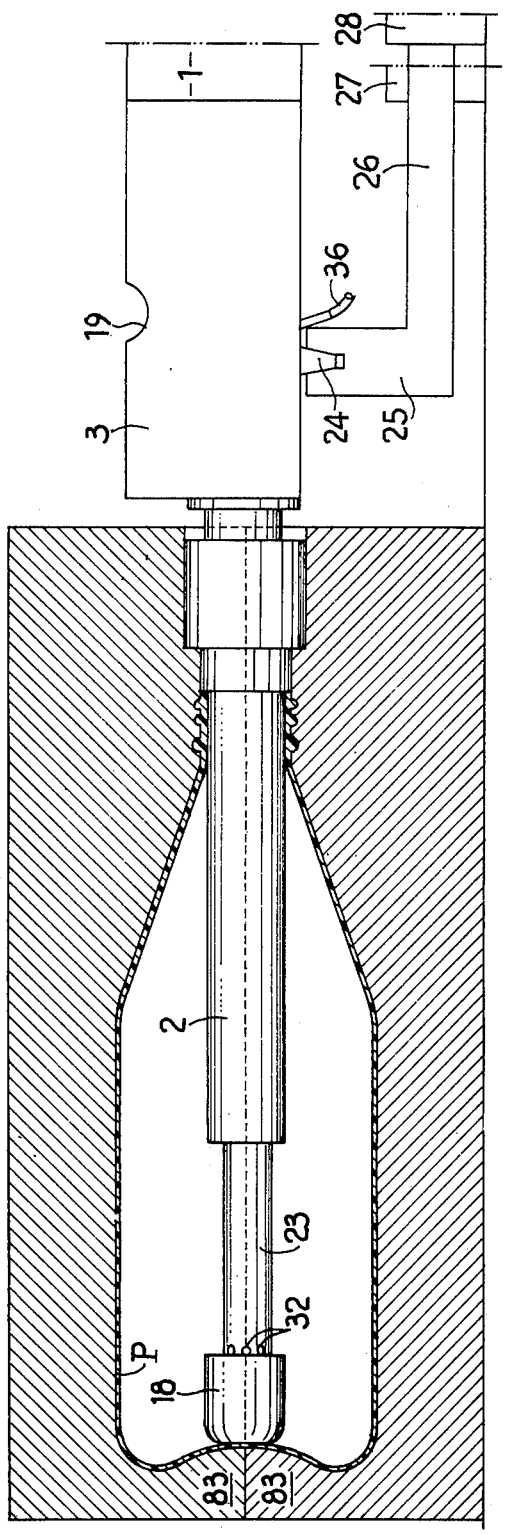

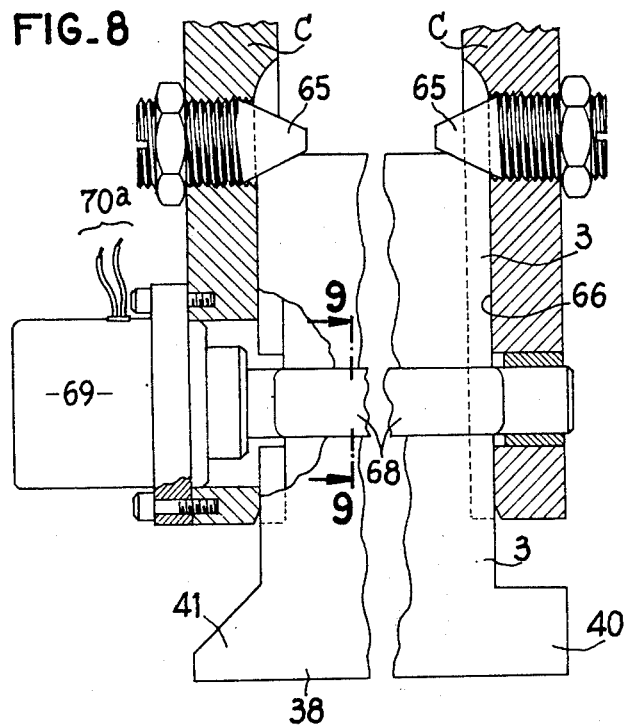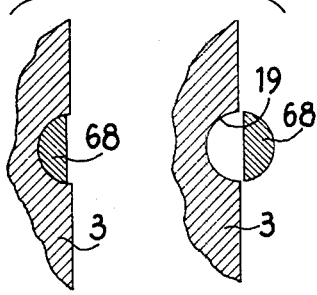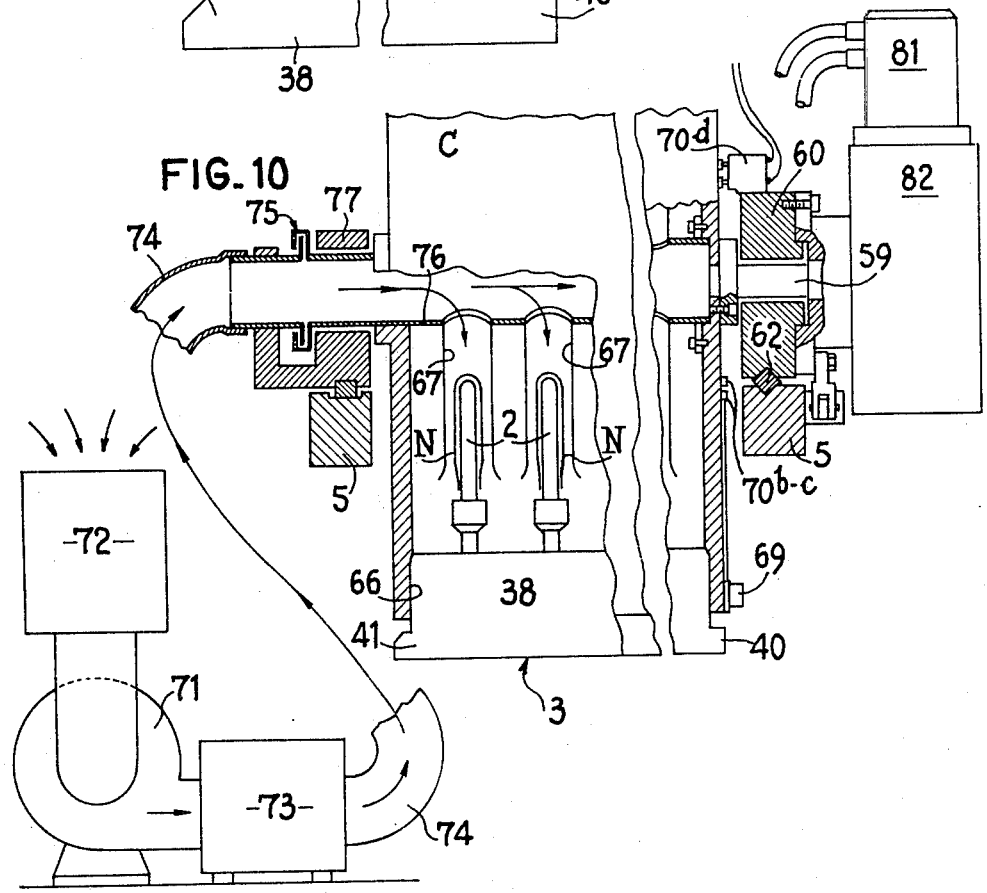

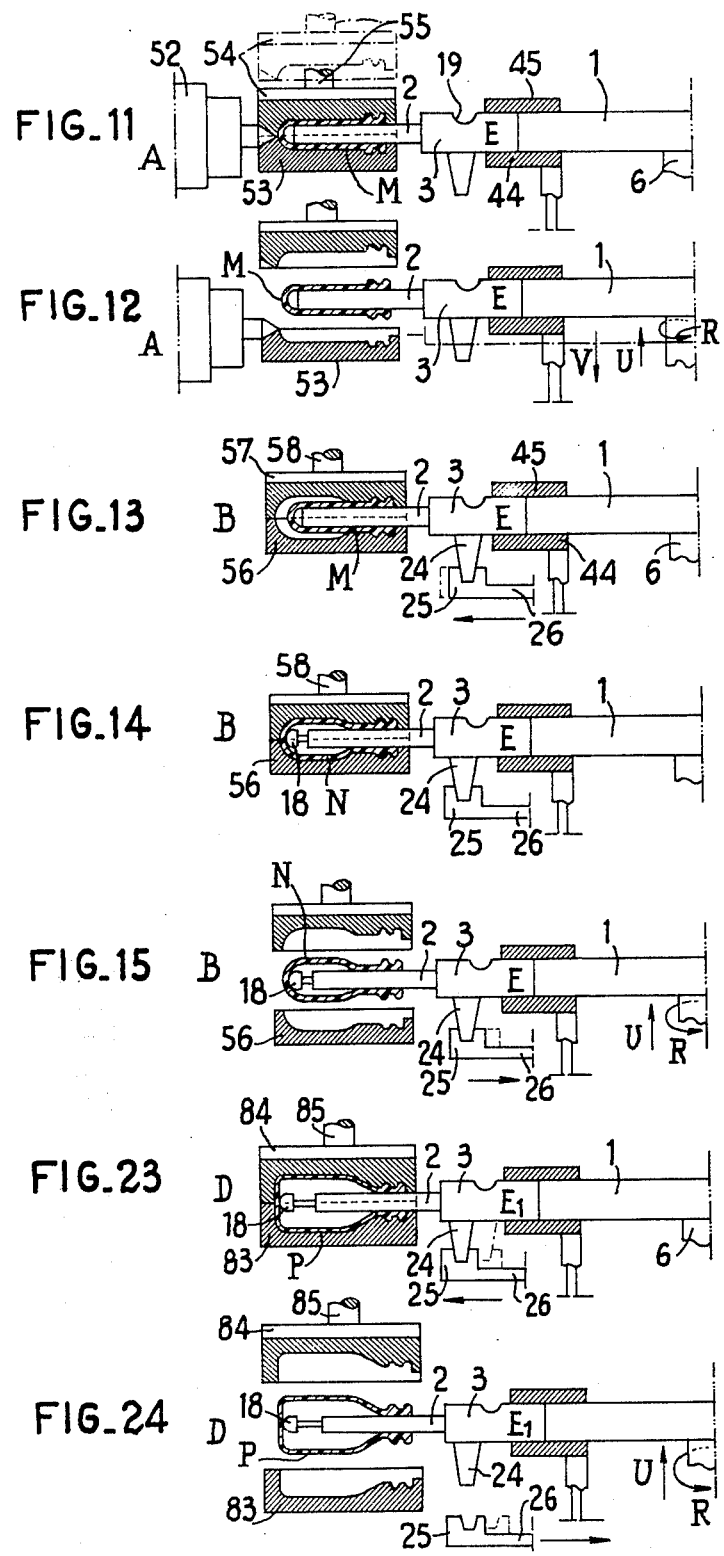

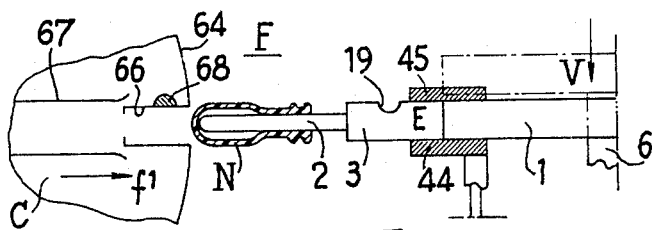
FIG_16
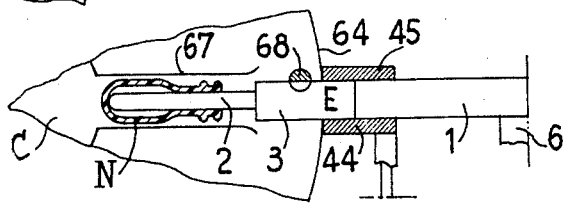
FIG_17
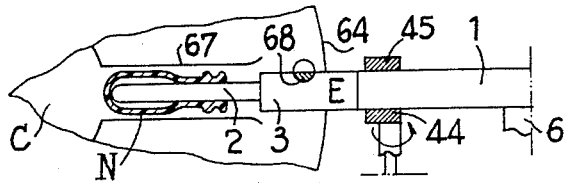
FIG_18
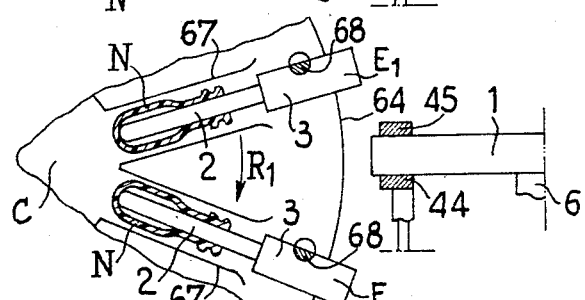
FIG_19
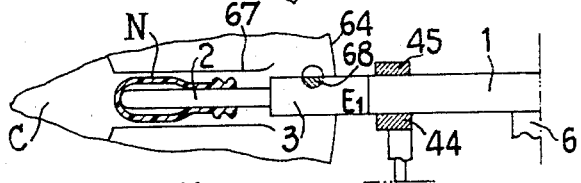
FIG_20
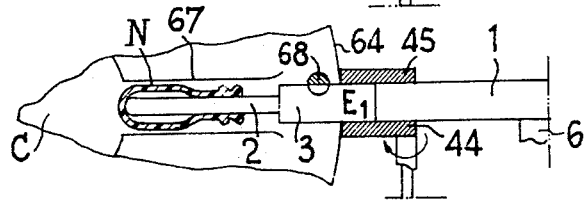
FIG_21
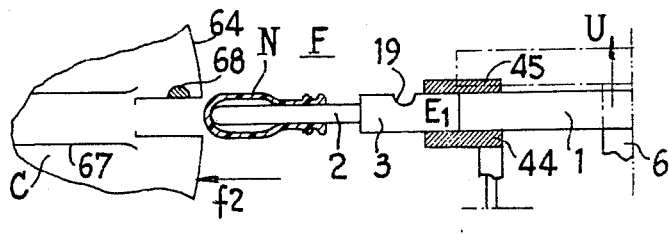
FIG_22

INJECTION AND BLOWING MACHINE FOR MANUFACTURING HOLLOW BODIES OF PLASTICS MATERIAL

The present invention relates to machines for manufacturing hollow bodies, in particular containers, of thermoplastic material, by the injection of a hollow blank or parison and the blowing of this blank or parison inside a mould for the purpose of expanding it to its final shape of a hollow body.

It relates more particularly to machines of the type comprising a polygonal rotary turret carrying on each side a set of blank support cores which the turret displaces by rotation in a step-by-step manner from a blank injecting station to a hollow body blowing station in passing through intermediate stations such as a blowing station.

In these machines, the injection and blowing moulds provided at the corresponding stations are usually in two parts one of which is fixed and the other movable, for example a rising part for the purpose of removing the body from the mould. In order to remove from each manufacturing station, that is to say, from its moulds, each set of cores carrying in succession blanks, possibly preforms and hollow bodies, the rotary turret is also usually movable in translation in a direction parallel to the moving part or the mould, that is to say, for example, it rises and descends in a travel which is obviously less than the travel of the moving part of the moulds.

Apart from these machines, there is moreover known a method termed a bi-axial orientation method, which consists in bringing as uniformly as possible the temperature of an injected blank or preform to a value in the neighbourhood of, and slightly higher than, the temperature of viscous transition of the considered plastics material, and drawing this blank or preform in two orthogonal directions in extending it axially and expanding it radially.

Heretofore, to the knowledge of the Applicant, it has not been possible to integrate this bi-axial orientation method in an injecting and blowing machine or installation, since it requires a temperature rise time in order to reach this aforementioned drawing temperature which is excessive for the injection and blowing cycle. Indeed, this time, which ranges from about 20 seconds for polymers, such as polyvinyl chloride and polyacrylonitrile to several minutes for polyethylene, is greater than the maximum stoppage time (about 10 seconds at the most) which is economically acceptable at the blowing station of such a machine.

Therefore, heretofore, a bi-axial drawing has been effected without employing injection and blowing machines in working, either on preforms issuing from tubes, or on injected preforms which are re-heated and possibly subjected to a complementary forming before blowing.

In an attempt to integrate the heat treatment in an injection-blowing cycle, it has been envisaged to stop the parison after injection at a station where a heat treatment is carried out, through the agency of the core which supports the parison, before passing it to the following blowing station. Now, for the reason of production rhythm mentioned hereinbefore, such a heat treatment can only be very short, with the following drawbacks:

a. It is difficult to control the quality, especially as the heating is more rapid and produces a heat gradiant in the wall of the blank or preform, that is to say a lack of homogeneity;

b. Consequently, the inevitable irregularities in the heating mentioned hereinbefore result in higher temperatures in the thinner zones which, at the moment of the final blowing, accentuates the irregularities in the thickness;

c. Moreover, the heat efficiency is low owing to heat losses in the preform which has been allowed to cool or has been cooled;

d. The treatment may be suitable for only certain materials and, moreover, on condition that a limitation in the extent of bi-axial orientation be acceptable in view of the risk of degradation of certain polymers owing to the rapidity and suddenness of the treatment.

Consequently, an object of the present invention is to solve the problem of the integration of the bi-axial orientation method in an injection-blowing machine while avoiding the aforementioned drawbacks and in particular allowing all the necessary time for a uniform heating, and on the spot, at the bi-axial orientation temperature, but without slowing down the other injection and blowing procedures, possibly pre-blowing, notwithstanding the length of the heat treatment time.

According to the invention, there is provided a machine of the aforementioned type, wherein the intermediate stations comprise a transfer station located on one side of the turret and there is provided, in facing relation to said transfer station, an oven having a plurality of stations moving step-by-step in a closed circuit, in starting from said transfer station of the central turret and returning thereto, each station of the central turret and oven receiving a set of support cores carrying blanks or preforms, and each set of support cores being mounted in an independent and removable manner on the central turret and on the oven so as to be capable of being transferred from the turret to the oven and, after a complete rotation of the oven, returning to the turret.

Also, according to the invention, it is advantageously arranged, in a machine of the aforementioned type comprising sets of support cores having parallel pins mounted on each side of the central turret, that each set be assembled on a pin carrying or core carrying bar or plate, each bar or plate comprising support, fixing and locking means cooperative with complementary support, fixing and locking means on the central turret and in the oven.

With this arrangement, after passing to the injecting station, each set of injected blank or parison support cores passes in succession, in a step-by-step manner, to a preform pre-blowing station provided to a station for transferring from the turret to the oven, to different temperature raising stations contained in the oven and, once again, to the transfer station for returning to the turret and finally to the blowing station for blowing the preforms to the final shape of the containers, without slowing down or disturbing the different manufacturing procedures carried out at each station.

Further features and advantages of the invention will be apparent from the ensuing description, given by way of example, with reference to the accompanying drawings, in which:

FIG. 3 is a partial plan view of the support, fixing and locking means for each set of blank supports on the turret;

FIG. 4 is a sectional view, taken on line 4—4 of FIG. 3, of the mechanism for actuating certain fixing means;

FIGS. 5 and 6 are sectional views of a set of blank support cores, one of which is at the injection station and the other at the pre-blowing station, the turret being in the lower position;

FIG. 7 is a similar view of the blowing station, the turret being in the lower position;

FIG. 8 is a partial sectional view of a core carrying bar or plate in the oven;

FIG. 9 is a partial sectional view, taken on line 9—9 of FIG. 8, of an oven lock in its two positions;

FIG. 10 is a diagrammatic assembly view of the oven, with parts cut away;

FIGS. 11 and 12 are diagrammatic illustrations, to a reduced scale, of the operation of the machine at the injection station;

FIGS. 13 to 15 are illustrations similar to FIGS. 11 and 12 of the operation of the machine at the pre-blowing station;

FIGS. 16 to 22 are diagrammatic illustrations, to a reduced scale, of the operation of the machine at the transfer station for transferring from the turret to the oven and vice-versa;

FIGS. 23 and 24 are illustrations similar to the preceding Figures, of the operation of the machine at the blowing station for producing the final shape of the containers;

Figure 1:
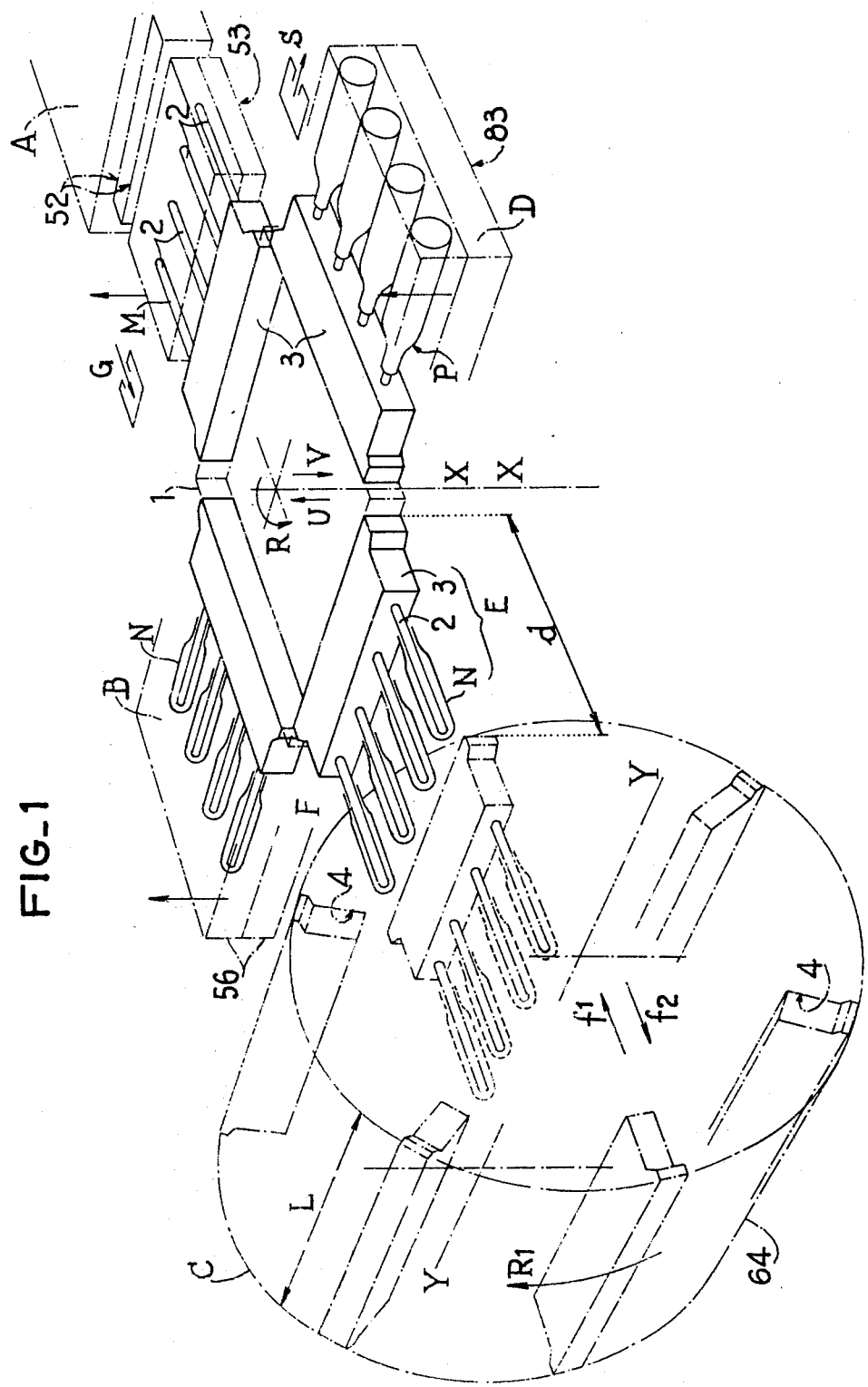
FIG. 1 is a diagrammatic perspective view of the assembly of the machine indicating its movements.

In the embodiment shown diagrammatically and symbolically in FIG. 1, the invention is applied to an injection-blowing machine which comprises, in the known manner, a polygonal, for example square, turret 1, which is rotatable in a step-by-step manner (arrow R) and movable upwardly and downwardly (arrow U for the upward movement and arrow V for the downward movement). The turret 1 is rotatable about its vertical axis X—X and is movable in translation along the same axis X—X upwardly or downwardly. The turret 1 carries, on each one of its four sides, a set E of cores or pins 2 which act as supports for blanks, preforms and containers of thermoplastic material. These cores or pins 2 are parallel and, for example, four in number in each set. Provided around this turret are a number of manufacturing stations which include: a station A for injecting blanks M, a pre-blowing station B for blowing preforms N, and a station D for blowing containers P.

According to the invention, there is placed, in front of one side of square turret 1 between the preblowing station B and blowing station D, a cylindrical oven C having an horizontal axis Y—Y and comprising a number of stations for progressively raising the temperature of the preforms introduced therein to the required bi-axial drawing temperature which is of the order of 122° to 170° C, this bi-axial drawing being carried out at the blowing station D. The oven C is located at a station F for transferring each set E of supports for preforms N from the turret 1 to the oven C and vice-versa, and it is mounted to be rotatable in a step-by-step manner in the direction of arrow R1 about the axis Y—Y.

For the purpose of their transfer from the turret 1 to the oven C, which is carried out at station F, each set E of cores or pins 2 is mounted, in an independent and removable manner, in succession on the square turret 1 and on the oven C, and again on the turret 1. For this purpose, the parallel pins or cores 2 of each set E are fixed to an assemblage bar or plate 3, here termed a core-carrying bar 3, and each bar 3 is maintained, clamped and locked, in succession on each side of the square turret 1 and on each stoving station, in recesses 4 provided in the oven C.

As can be seen, it is therefore a novel feature of the machine to comprise, travelling in a complete cycle of manufacture, a total number of sets E of pins 2 supporting blanks M, preforms N and containers P, which is equal to the sum of the sides of the square turret 1 and the number of recesses 4 provided in the oven C. The number of sets E having core-carrying bars 3 is therefore distinctly higher than that of the sides of the square turret 1, whereas in known machines, the sets E of pins 2 which are integral with the square turret 1, are of a number equal to the number of sides, that is to say four.

In the course of a complete rotation of the central turret 1, each set E having a core-carrying bar 3 therefore passes through the successive stages of manufacture by rotations of the turret 1 through 90° and other movements of the turret and oven: injection at station A, pre-blowing at station B, transfer to the oven C, departure for a rotation of stoving and simultaneously transfer to the turret 1 of another set having terminated its stoving rotation, and finally blowing or bi-axial drawing at station D.

The machine will now be described in detail as concerns in succession: the turret 1 (FIGS. 1, 2 and 3), the removable fixing of a set E of pins 2 to the turret 1 (FIGS. 3, 4, 5, 6 and 7), the injection station (FIG. 2), the pre-blowing station (FIG. 6), the transfer station (FIGS. 2, 3, 4, 8 and 9), the oven (FIGS. 8, 9 and 10), and finally the operation of the machine (diagrams of FIGS. 11 to 24).

Figure 2:
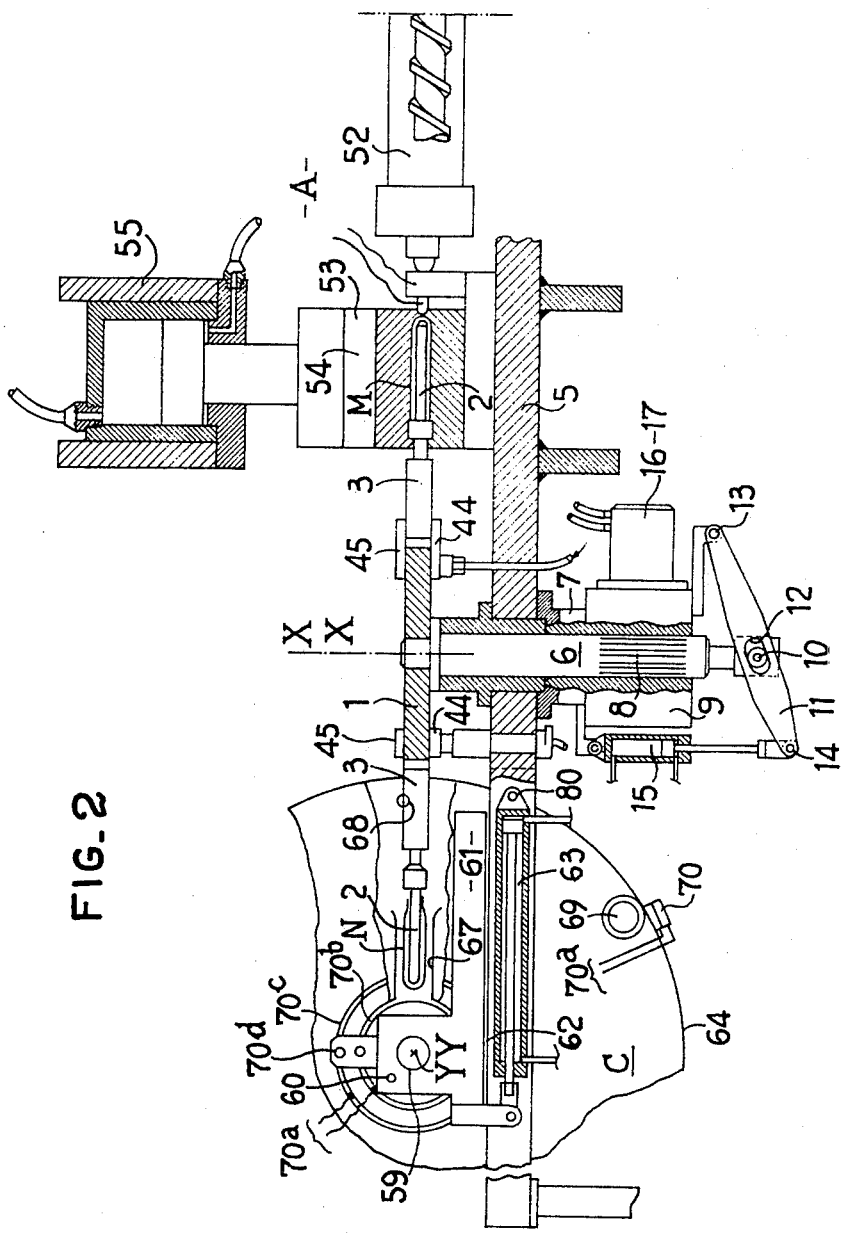
FIG. 2 is a diagrammatic sectional view, taken on line 2—2 of FIG. 1, of the central turret, the injection station, the transfer station and the oven.

MACHINE FRAME (TABLE) AND TURRET (FIGS. 2, 3 and 4).

The frame of the machine is constituted by a horizontal table 5 carrying the turret 2 and the different manufacturing stations A, B, D, or at least the injection, pre-blowing, and blowing moulds, and the oven C and the mechanism for raising, lowering and rotating the turret 1 and rotating and moving in translation the oven C.

The square turret 1 is carried at its centre on a vertical axis X—X by a vertical shaft 6 having an axis X—X on which the turret is keyed. The shaft 6 is carried by a step-bearing 7 fixed to the table 5. The shaft 6 is rotatable and slidable in the step-bearing 7 so as to rotate, raise and lower the turret 1. Mechanism for rotating and raising and lowering the turret (FIG. 2).

The shaft 6 is provided in its lower part 6 with splines 8 slidable in corresponding splines of a sleeve 9 which is also mounted in the step-bearing 7. The sleeve 9 rotates the shaft 6 but allows it to move in translation. The lower end of the shaft 6 carries radially and horizontally a block or lug 10 for the pivotal mounting of a lever 11. This lever is pivotably mounted at roughly its middle in a slot 12 on the block 10. At one end 13 it is pivoted to the step-bearing 7. At the other end 14 it is pivoted to the piston rod of a double-acting vertical jack 15 for raising and lowering the turret 1. The jack 15 is secured to the step-bearing 7 or the table 5.

Fixed to the step-bearing 7, is an electromechanical system 16 for indexing the turret in respect of rotation which is connected to rotate with the splined sleeve 9 and is driven in rotation by a motor 17. The indexing system 16 ensures the step-by-step rotation of the turret 1 by quarters of a rotation (90°) with stops between two successive rotations through 90°.

SET E OF PINS OR CORES (FIGS. 1–5).

Each set E of pins 2 is independent. It comprises a flat prismatic plate or bar 3 for carrying the cores and a number of parallel cores or pins 2 which have a cylindrical outer shape and are rounded at the end. These cores or pins are fixed and assembled on the plate 3. Here four pins 2 are shown for each set. Each core or pin 2 terminates in a rounded nose 18 which is extensible for the purpose of effecting the bi-drawing operation or the bi-axial orientation operation. The core-carrying plate or bar 3 is provided with a semi-cylindrical recess 19 which is adapted to cooperate with a lock for the stove C. The plate 3 is hollow and each pin 2 is also hollow. Each pin 2 is provided internally from one end to the other of its length, with a cylindrical cavity 20 opening into a common cavity or chamber 21 inside bar or plate 3. The chamber 21 of the plate 3 communicates with the exterior by way of a longitudinal groove 22 parallel to the pins 2. The plate 3 has, extending therethrough, conduits supplying and discharging blowing fluid and fluid for cooling the blanks M and plastics preforms N. Interior mechanism controlling the extensible noses 18 (FIGS. 5, 6 and 7).

Each extensible nose 18 of the pins 2 is mounted on the end of a rod 23 which extends through the cylindrical cavity 20 of the pin 2 in which it is slidable and extends through the inner chamber 21 of the plate 3. The nose 18 is thus mounted on the pin 2 as a valve head on its seat. Moreover, in moving away from its seat on the pin 2, the nose 18 forms an annular passage for blowing and cooling fluid for the blanks M or plastics preforms N. The different rods 23 of the sets of pins 2 are fixed at their other end in the inner chamber 21 to a common shifting finger member 24 perpendicular to the rod 23 and projecting out of the plate 3. The common shifting finger member 24 is slidable in the groove 22 through which it extends. The finger member 24 has a conical shape capable of fitting into a complementary conical cavity of a shifting fork 25 and capable of disengaging therefrom in the course of the descending and rising movements of the turret 1. The fork 25 is carried by a push-rod 26 which is parallel to the pin 2, slidable by the action of a jack 28 in a slideway 27 fixed to the table 5. Device for cooling and blowing blanks M and plastics preforms N (FIGS. 5–7).

Cooling the blanks through the agency of the cores (rod 23 in the retracted position). The rod 23 of the nose 18 is hollow. It is a tube adapted to serve as a conduit 29 for blowing and cooling the blanks M and preforms N. The cooling fluid enters this tube by way of radial orifices 30 which open onto a manifold chamber inside the pin-carrying plate 3 so as to be connected therein to a common conduit 31 supplying cooling fluid, for example air under pressure, carbonic gas or a mixture of air and water. The outlet of the cooling fluid from the conduit 29 is by way of radial orifices 32 which open onto the seat of the nose 18 on its tubular rod 23. In contradistinction to the inlet orifices 30, the outlet orifices 32 are always open. Formed between the tubular rod 23 and each pin 3 is an annular clearance constituting an annular conduit 33 which is open at the end thereof adjacent the nose 18 and communicates with the radial orifices 32 which open onto the seat of the extensible nose 18. At its other end adjacent the hollow plate 3, each annular conduit 33 is connected through a common manifold chamber to a cooling fluid outlet conduit 34. Thus, with the rod 23 in the retracted position, the cooling fluid can flow along the pin 2 inside the latter in the following circuit: inlet at 31, introduction into the core at 30, central passageway 29 toward the nose 18, passage in the annular passageway 33 by way of the orifices 32 and finally outlet at 34. Pre-blowing and blowing of the preforms (rod 23 in the partially or totally extracted positions).

For the purpose of pre-blowing the preforms N, the blowing fluid under pressure flows through also the axial tubular conduit 29 and the outlet orifices 33. But it cannot be introduced into the conduit 31 and the radial orifices 30 owing to the mobility of the tubular rod 23 constituting a closing valve member for the orifices 30 when the pins 2 have been extended by the outward movement of the nose 18. The shifting finger member 24 is hollow to constitute a conduit 35 connected to a source of fluid under pressure by a flexible piping 36 and connected to the inner conduit 29 by way of the orifices 37.

REMOVABLE FIXING OF A SET E OF PINS 2 ON THE TURRET 1 LOCKING (FIGS. 2, 3 and 4).

Each set E of pins 2 comprises a prismatic and flat plate 3 having an enlarged head 38 the end face 39 of which is adapted to be clamped against each side face of the turret 1 (FIGS. 1, 2 and 3). The head 38 has, on one side, a rectangular projection or heel 40 for receiving locks and, on the opposite side, a projection or heel 41 having a chamfer for the bearing of locks centering the plate 3 on the turret 1. Locks on the turret 1 (FIGS. 2–5).

Mounted on each side of the turret 1 are locks adapted to cooperate with the enlarged head 38 of each set E of pins 2. There are on each face of each side of the turret two lateral locks which are more precisely clamping jaws for the enlarged head 38, namely a lateral lock or jaw 42 having an L-shaped section, complementary to the rectangular heel 40, and a lateral lock or jaw 43 having a trapezoidal cross-sectional shape the oblique side of which is complementary to the chamfered heel 41. Added to the lateral jaws 42 and 43 in the vicinity of the edges and on the lower and upper faces, are two pairs of lower and upper rotary locks 44 and 45. The turret 41 is therefore provided with eight lateral jaws 42–43 and sixteen rotary locks 44–45.

Each lateral lock 42 and 43, carried by a side face of the turret 1 in the extension of the surface of the latter, is elastically secured to said side face. For this purpose, it is carried with a slight clearance by at least one bolt 46 which is screwed into said side face of the turret. The head of the bolt 46 defines with the lock 42 or 43 a clearance which is occupied by an elastically yieldable return means 47, such as a Belleville washer. This Belleville washer is capable of being crushed when the jaw 42 or 43 is moved away from the side face of the turret 1 by a push-rod 48 which is mounted in the turret 1 to slide in a direction perpendicular to the side face of the turret against which face the jaw 42 or 43 bears (FIG.

4). The push-rod 48 is shifted by an eccentric 49 which extends throughout the thickness of the square turret 1 in a direction perpendicular to the push-rod 48.

When the eccentric 49 presents a region of minimum radius in front of the push-rod 48, the lateral jaw 42 or 43 is applied under the action of the Belleville washer 47 against the pin-carrying bar 3. On the other hand, when the eccentric 49 presents a region of maximum radius in front of the push-rod 48, the lateral jaw 42 or 43 is shifted away from the side face of the turret 1, that is to say, disengaged therefrom, since the Belleville washer 47 is compressed.

Each lower lock 44 and upper lock 45 is integral with a common journal 50 which extends vertically through the turret 1. The locks 44 and 45 are adapted to pivot through an angle of less than 90° either for projecting from the turret 1 adjacent the bar 3 so as to maintain it at the same height as the turret 1, or, for withdrawing within the periphery of the turret 1.

As the locks 42, 43, 44 and 45 must be locked simultaneously so as to maintain or release a pin-carrying plate 3, they are shifted by a linkage 51 having levers common to each pair of lower and upper locks 44, 45 and to the nearest lateral jaw 42 or 43. The turret 1 therefore has two linkages 51 per side face and eight linkages in all. Thus with respect to each side face of the turret 1 on which a set 2 must be applied and clamped by its plate 3, the unlocking and disengagement of the jaws affords the plate 3 a degree of freedom allowing it to escape from the turret 1 in sliding in a direction perpendicular to its square surface, that is to say, in sliding vertically along the side face of the turret 1. The pin-carrying plates 3 are maintained locked to the turret 1 except for the pin-carrying plates located at the station F at which there occur an unlocking as illustrated in FIGS. 18-21. The unlocking and relocking operations are effected by simultaneous actions on the jacks 42, 43, 44, 45 located at station F. These operations can, for example, be carried out by a mechanical coupling of the lock linkages to a control device located at the fixed station at F, this coupling being produced when the turret descends. The control device may be actuated by a jack.

INJECTION STATION A (FIGS. 1, 2, and 5).

This station comprises an injection machine 52 having multiple nozzles and screws (in a number equal to the number of pins 2), only one of which is shown in FIG. 2. An injection mould 53 comprises two parts separated by a horizontal median joint plane. The lower part is fixed to the table 5. The movable upper part is fixed to a mould-carrying plate 54 which is integral with a piston rod of a vertical jack or ram 55. The mould 53 contains as many mould cavities as there are pins or cores 2 that it receives in the cavities. The cavities have the outer shape of the blanks M. The inner shape of the blanks M is imparted thereto by the pins or cores 2. The injection mould 53 is placed in front of one side of the turret 1, the median joint plane being parallel to the turret 1 and the axes of the injection orifices, which are also those of the nozzles and injection screws of the machine 53, being perpendicular to the side of the turret 1 but located in a horizontal plane. The moulding cavities have their injection axes perpendicular to said side of the turret 1.

PRE-BLOWING STATION B (FIGS. 1 and 6)

It comprises a pre-blowing mould 56 which is also in two parts separated by a horizontal median joint plane, the lower part being fixed and the upper part integral with a mould-carrying plate 57 which is shifted by a vertical jack 58. The pre-blowing mould 56 is disposed with respect to the turret 1 in the same way as the foregoing injection mould 53, but on the following side of the turret 1. In the same way as the preceding mould, it contains as many pre-blowing mould cavities as there are pins 2 that it is adapted to receive. The cavity has the outer shape of the preforms M which are larger than the blanks N. As already mentioned, the pre-blowing fluid is introduced by way of the pins 2. The pre-blowing mould 56 is suitably cooled by cooling fluid circulating means which are of known type and have not been shown.

OVEN C (FIGS. 1, 2, 8, 9 and 10).

Position and general construction. The oven C has a generally cylindrical shape which is that of the housing having an horizontal axis Y—Y which is parallel to a side of the turret 1 which follows the side pertaining to the pre-blowing station. The length L of one generatrix of the housing of the oven C (or width of the oven C) corresponds to the length of one pin-carrying plate 3. The housing of the oven C is journalled on a shaft 59 carried by a bearing 60 which is carried by a shoe 61. The latter cooperates with a slideway 62 for movement in translation in a horizontal direction perpendicular to the axis Y—Y of the oven and therefore perpendicular to the corresponding side of the turret 1 with respect to which the oven C must move in either of two directions, namely toward this side or away from this side. The slideway 62 is integral with the table 5. Cavities for the sets E of pins 2 (FIG. 10).

The cylindrical housing of the oven C is hollow but its outer cylindrical surface 64 is recessed by a number of cavities 4 of rectangular section the general dimension of which corresponds to the outer dimension of each pin-carrying plate 3 of a set E so as to form sockets 66 in which the pin-carrying plates 3 are fitted. In the presently-described embodiment, the oven C has six radial cavities 4 forming sockets 66 spaced 60° apart on the periphery of the oven C (surface 64).

The depth of each cavity 4 is limited, so as to limit the inward movement of a set E, by a pair of adjustable abutments or stops 65 (FIG. 8) constituted, for example, by a pair of set-screws having a conical point and extending through lateral side walls of the housing C in which they are screwed to extend into the cavities 4. The two stops 65 of each pair are in the axial extension of each other on an axis parallel to the axis Y—Y of the housing. Each pin 2 of each set E thus fitted in a cavity 4 is introduced with clearance into a radial pipe 67 which is disposed inside the oven and receives hot air through a manifold described hereinafter. In respect of each set E, there is therefore as many parallel pipes 67 as there are pins 2. Locking of the sets E of pins 2 in the oven C (FIGS. 8 and 9).

Mounted on the periphery of the cylindrical housing of the oven C, in the vicinity of each cavity 4 and in a number equal to the number of cavities 4, are locking pins 68 which are parallel to the generatrices of the housing and to the axis Y—Y of the oven C. Each locking pin 68 has a semi-cylindrical cross-sectional shape with a diametral flat adapted to cooperate with the corresponding semi-corresponding recess 19 of each plate 3. Each locking pin 68 extends through a socket 66 of a cavity 4 alongside of face of said socket and parallel to the plane of the turret 1 and to the axis Y—Y so that, when it is the flat which is turned toward the interior of the socket 66, said flat is flush with the inner wall of the socket 66 and leaves the socket section 66 entirely clear for receiving a plate 3 of a set E and that, when it is the semi-cylindrical part which is turned toward the interior of the socket 66, it projects inside the socket and blocks the passage through the rectangular section of the socket 66. Each pin 68 is carried by a rotary electromagnet 69 fixed to an end wall of the housing of the oven C and supplied with current through neighbouring studs 70. There are therefore as many electromagnets 69 and corresponding studs 70 as there are cavities 4. The studs 70 are connected by a pair of wires $70^a$ to electrically conductive slip rings $70^b$ and $70^c$ which are concentric on the axis Y—Y and are of different diameters. The two rings $70^b$ and $70^c$ are fixed to a side wall of the housing of the oven C and are in constant electric contact with two contacts of an electric supply collector $70^d$ which is fixed, for example, to the bearing 60 of the shaft 69 and connected by flexible wires to a source of electric current (not shown). Each electromagnet 69 is capable of rotating the locking pin 68 through 180° about its axis so as to present inwardly of the socket 66, either the semi-cylindrical part after a fitting of a set E of pins 3 in the locking position, or the diametral flat in the unlocking position for unlocking the set E and allowing the fitting or disengagement thereof. Heating of the oven C (FIG. 10).

The oven C is supplied with hot air by a fan 71 into which the air enters by way of a filter box 72. The fan 71 urges the air through heat exchanging and temperature regulating means 73 by way of a tubular duct 74. The duct 74, which is nonrotatable but flexible and supple owing to the movements in translation of the oven C, is connected, in a sealed manner and through a rotary joint 75, to a rotary axial rigid tubular manifold 76 which extends into the housing of the oven C on the axis Y—Y and is connected to rotate with this housing. It is from the tubular manifold 76 that the radial branches or pipes 67 extend, these pipes being angularly spaced 60° apart in the presently-described embodiment for the heating of pins 2 introduced in the pipes 67. Note that the rotary joint 75 is carried by a bearing 77 having a shoe 78 which is slidable on a support slideway 79 in a direction parallel to the slideway 62. Movements of the oven C (FIGS. 1, 2 and 16–22).

Movement of translation : the shoe 61 of the bearing 60 of the oven C is connected to move in translation with the piston rod of a horizontal jack 63 employed for moving the oven in translation. The body of the jack 63 is pivoted to the table 5 at 80. The travel $d$ of the jack 63 and the active length of the slideways 62 and 79 correspond to the maximum distance between the lateral side face of the turret 1, at the stoving station, and the cylindrical surface 64 of the oven housing in the region of a cavity 4 located in the same plane as the turret 1 (FIG. 1).

Movement of rotation : the shaft 69 of the oven C is connected to a unit which comprises a motor 81 and an indexer 82 and is fixed to the table 5 (FIG. 10). Owing to this motor indexer unit 81-82, the oven C is driven in rotation in a step-by-step manner in coordination with the movements of the turret 1, this rotation of the oven occurring moreover during a stoppage of the turret 1 in the lower position. More generally, if the oven C has a diameter large enough to comprise $n$ cavities 4, $n$ being larger than six, each rotation of the oven C occurs through an angle of $360°/n$.

BLOWING STATION D FOR CONTAINERS P
(FIGS. 1, 7, 23 and 24)

It comprises, in the known manner, a blowing mould 83 in two parts separated by a horizontal median joint plane, the lower part being fixed and the upper part being movable and integral with a mould-carrying plate 84 which is shifted by a vertical jack 85 of which only the piston rod is seen in FIGS. 23 and 24. The mould 83 is disposed, relative to the turret 1, in the same plane as the injection and pre-blowing moulds 53 and 56 and opposite the mould 56 on the turret 1. This mould 83 contains as many blowing mould cavities as there are pins 2 to be received thereby. The mould cavities have the shape of the outer face of the containers P to be produced and are consequently larger than those of the preforms N. As already mentioned, the blowing fluid is introduced by way of the pins 2, and more particularly by way of the orifices 32, the noses 18 of the pins 2 being extended. The mould 83 is suitably cooled by cooling fluid circulating means which are of known type and have not been shown.

OPERATION

Each set E having core-carrying plates 3 passes through the following manufacturing stages in the course of one complete rotation of the turret 1 : stages A, B, C and D, in the course of which stages the cores 2 undergo, in parallel and simultaneously, the operations pertaining to each station. 1. Introduction of the set E at the injection station A (FIGS. 1-4, 11 and 12) at the entrance G of the machine (solely when starting up the machine) : With the injection mould 53 open (FIG. 12), a set E is put in position on the turret 1 in the following manner. The turret 1 is raised to the upper position by the vertical jack 15 above the lower part of the mould 53. The lower and upper locks 44 and 45 of the turret 1 are open, that is to say withdrawn within the periphery of the turret 1. The clamping jaws 42 and 43 are moved away elastically, in opposition to the action of the Belleville washers 47, by means of the linkage 51 so as to allow a passage for the heels 40 and 41 of the enlarged head 38 of the plate 3. A set E is presented between the two mould parts 53 in such manner that its enlarged head 38 is the region of the lateral side face of the turret 1, but below the latter, so as to be capable of engaging by its heels 40–41 between the lateral jaws 42–43. The turret 1 is lowered (direction V) by the jack 15. The plate 3 slides relative to the turret and stops between the jaws 42 and 43. The linkage 51 is then actuated in such manner as to reclamp the jaws 42 and 43 and pivot the locks 44–45 in the direction for locking the plate 3. The set E is then integral with one lateral side face of the turret 1 to which it is clamped. 2. Injection at A (FIGS. 11 and 12) : The injection mould 53 is closed by the jack 55. The machine 52 injects plastics material into the mould 53 around each core or pin 2 and thus produces blanks M which must remain in a position on the core or pin 2 in the course of the subsequent manufacturing stages. 3. Changing stations : The injection mould 53 and moreover the other moulds open. The turret rises and then rotates through 90° in the direction of arrow R and stops owing to the action of the indexing system 16–17. The blanks M are thus located between the pre-blowing semimoulds 56 which semi-moulds are opened by the jack 58. 4. Pre-blowing at B (FIGS. 5 and 13–15) : The turret 1 redescends (arrow V). The pre-blowing mould 56 is closed by the jack 58. The finger member 24 (whose size has been exagerated in the diagrams of FIGS. 11-24 for the purpose of clarity) engages in the shifting fork 25. This finger member 24 is shifted a short distance by the fork 25 so as to shift the extensible noses 18 away from their seats on the pins 2. Each blank M is thus slightly extended or elongated and this constitutes a first drawing operation in the axial direction. Each extensible nose 18 uncovers in this way an annular passage for a blowing fluid which is supplied by way of the flexible piping 36, the conduit 35, the radial orifices 37, the central conduit 29 inside the rod 23 and the outlet orifices 36. The blowing fluid inflates the blank M and applies it against the walls of the cavity of the mould 56 and converts it into a preform N. This constitutes a second drawing operation in the radial direction. Thus it is possible to term this a bi-drawing operation, although it is a slight bi-drawing operation, at the pre-blowing station B. The cooling fluid escapes by way of the annular conduit 33 and the conduit 34. In the course of its flow to the outlet, the blowing fluid cools the preform N, directly, upon contact therewith in the course of the extension and, indirectly, by the cooling of the cores or pins 2, this pre-cooling being necessary for certain polymers. Finally, the mould 56 opens. 5. Changing stations-transfer of a set E of pins to the oven C (FIGS. 16–18) : The turret 1 rises (arrow U) and this removes the preforms N(still carried by the pins 2) from their moulds and then the turret rotates through 90° in the direction of arrow R and stops and redescends owing to the action of the indexing system 16–17. While two other sets E of pins 2 are thus in position at the preceding stations A and B, the set E which was previously at the pre-blowing station B is located in the transfer zone F at the stoving station C in front of an empty cavity 4 (FIG. 16). During the stoppage of the turret 1 at the transfer station F, the oven C, which was moved away from the turret 1 and has stopped, is moved toward the turret (arrow f1) by the action of the jack 63 (FIG. 17). The lock pin 68 is in the withdrawn position and allows a clear passage through the socket 66 of the cavity 4. The oven "takes in" in the course of its translation a set of pins E, the plates 3 being stopped by the adjustable stops 65 at the end of the socket 66 and the pins 2 carrying the preforms N being introduced into the heating pipes 67. The electromagnet 69 rotates the pin 68 to the position for locking the plate 3 so that the semi-cylindrical part of the pin 68 enters the recess 19. The linkage 51 of the turret 1 unlocks the locks 44 and 45 which rotate to the withdrawn position (FIG. 18) at the same time as the jaws 42-43 release their clamping action on the heels 40 and 41 of the plate 3. The set E is then locked in the oven C and unlocked with respect to the turret 1 which it is ready to leave. 6. Stoving and transfer of a set E from the oven C to the turret 1 (FIGS. 19-22) : Under the action of its motor 81-indexer 82 unit, the oven C rotates (arrow R1) through 60° in the presently-described embodiment (through 360°/n in the general case of n cavities 4) and displaces the set E of pins 2 (FIG. 19). The oven C then stops its rotation when another set E1 of pins 2, which has effected a complete stoving rotation from the transfer station F, has returned to the transfer station F in front of the turret 1 (FIG. 20) and is thus engaged in the jaws 43-44 of the turret. The corresponding electromagnet 69 rotates the pin 68 in such manner as to present the flat inwardly of the socket 66 while the linkage 51 of the turret 1 rotates the locks 44 and 45 to the projecting position and the jaws 42 and 43 to the position for clamping the heels 41 and 42 of the plate 3. The set E1 which has thus effected a stoving rotation is then unlocked from the oven C and locked to the turret 1 (FIG. 21). In order to permit the turret 1 to rotate through 90°, the oven C is withdrawn (arrow f2) and the set E1 which has been regularly heated during a given period of time in the course of its sejourn in the pipe 67, is now ready to reach the blowing station D, the preforms N which have just been stoved being ready to undergo a blowing treatment, that is to say, the extension or bi-orientation or bi-drawing, owing to the fact that they have reached the temperature required for this deformation. The stoved set E1 will now be followed to the station D, while ignoring the set E which has just been introduced into the oven C where it will stay until it returns to the turret 1. 7. Station D for blowing, bi-orientation or bi-drawing, outlet S (FIGS. 1, 7, 23 and 24) : The moulds open, then the turret rises and rotates through 90°. The set E1 passes from the transfer station F to the blowing station D where the turret is in the upper position above the open blowing mould 83. The turret 1 and the upper mould 83 descend so that the set E1 of pins 2 and the preforms N are introduced into the mould 83 while the finger member 24 for shifting the extensible noses 18 is engaged on the fork 25. The latter shifts the noses 18 still further away from their seat on the pins 2 until the preforms N touch the inner ends of the mould cavities and this produces an axial drawing. At the same time, a blowing fluid is introduced by way of the conduits 36, 35, the orifices 37, the central conduit 29 and the radial orifices 32. The preforms N are thus expanded and applied against the walls of the mould cavity of the mould 83 and are cooled upon contact therewith. However, this blowing fluid flows in the return direction to the annular conduit 33 which surrounds the hollow rod, flows along the outlet conduit 34, and escapes by way of the conduit 31. In the course of its return travel, the blowing fluid cools the pins 2 and consequently a part of the inner wall of the expanded container or bottle P, while it directly cools a large part of the inner wall of each container P in flowing along said inner wall outside the pin 2. The plastics material thus undergoes another drawing operation in a direction orthogonal to the axial direction of the preceding drawing — hence the terminology of this procedure : bi-drawing or bi-orientation (FIG. 23). The preforms N have assumed the final shape of the containers or bottles P. At the end of this expansion, the jack 85 opens the mould 83. The turret 1 rises and the bottles or containers P are then ejected from the cores and extracted from the machine. 8. Change of station : The turret 1 rotates through 90° and stops, the set of cores arriving from station D being placed between the semi-moulds of the injection mould 53. The turret descends and the mould closes and a new cycle recommences by an injection at station A.

By way of a non-limitative example, a general cycle may be summarized as follows:

1/ The moulds open.

2/ The turret 1 rises; the finished containers are ejected at D.

3/ The turret rotates through 90° and stops.

4/ The turret descends.

5/ a. The moulds are closed : the injection, the pre-blowing and the blowing occur respectively at A, B and D.

b. Simultaneously at F : the oven advances; the core-carrying bar is unlocked from the turret and locked in the oven; the turret rotates through 360°/n which removes from the turret a core-carrying bar which enters the stoving cycle and thereafter returns to the turret a core-carrying bar which leaves the oven; the last core-carrying bar is unlocked from the oven and locked to the turret; the stove is moved away from the turret.

6/ The moulds are opened and an identical cycle recommences.

The advantages of the machine are the following among others:

Owing to the integration of the stove C into the manufacturing cycle of the plastics containers having a bi-axial orientation as a station at which the turret 1 stops between the pre-blowing station D and blowing station D, the preforms N are heat treated before the bi-drawing under the optimum conditions of uniformity of heating, and therefore of equality of the finished products, and under the optimum conditions of heat economy.

Owing to the construction of the oven C in the form of a rotary cylinder which has $n$ cavities 4 for sets E of supports for preforms N and is capable of removing the preforms N from the turret 1 and returning them to the turret, it is possible to carry out the heat treatment required for the bi-drawing without slowing down the other manufacturing stages A (injection), B (pre-blowing) and D (bidrawing blowing. In other words, the stoving time at C has no influence on the times spent at the other stations A, B and D.

Owing to the mounting of the blanks M and preforms N on sets E of supporting cores 2 having plates 3, and more particularly owing to the removable character of the sets E with respect to the turret 1 and the oven C, the inclusion of the oven C into the injection-blowing installation is possible.

Owing to the support and locking systems on the turret 1 (bearing faces for the prismatic plates 3, jaws 42 and 43 and heels 40 and 41, lower and upper locks 44 and 45) and on the oven C (sockets 66 having stops 65, rotary semi-cylindrical lock pins 68 and semi-cylindrical recesses 19 in the plates 3), the sets E can be fixed either to the turret 1 or in the oven C and transferred from one to the other.

Owing to the aforementioned locking system and the movements of translation in both directions (f1 and f2) of the oven C whith respect to one side of the turret 1 in the transverse plane F, the oven C can take the sets E from the turret 1 and return them thereto.

It will be understood that various modifications may be made in the embodiment just described without departing from the scope of the invention. Thus the turret 1 could be polygonal and have more than four sides, for example it could have one or two additional and successive stations for injection A1, A2, A3 of a plurality of different materials (for containers having a plurality of wall layers). There could also be provided an output station for the moulded containers following on the blowing station D. On the other hand, the pre-blowing station B may be optional. Moreover, for the purpose of transferring sets E between the turret 1 and the oven C, the oven C could be movable in translation in a direction of its axis Y—Y instead of in a direction perpendicular to the axis Y—Y. Instead of being cylindrical, the oven C could be a conveyor moving under a heating tunnel. In addition to the heating, other operations could be carried out in the oven C, such as sterilization, marking, or painting. Instead of the axis X—X of the turret 1 being vertical and the axis Y—Y of the oven C horizontal, the reverse arrangement could be adopted, the axis X—X being horizontal and the axis Y—Y vertical. Finally, at the moment of closing the moulds, it could be possible to partially unlock the core-carrying bars with respect to the turret so as to allow these bars a slight freedom with respect to the turret and in this way facilitate the centering of the cores relative to the moulds.

Figure 25:
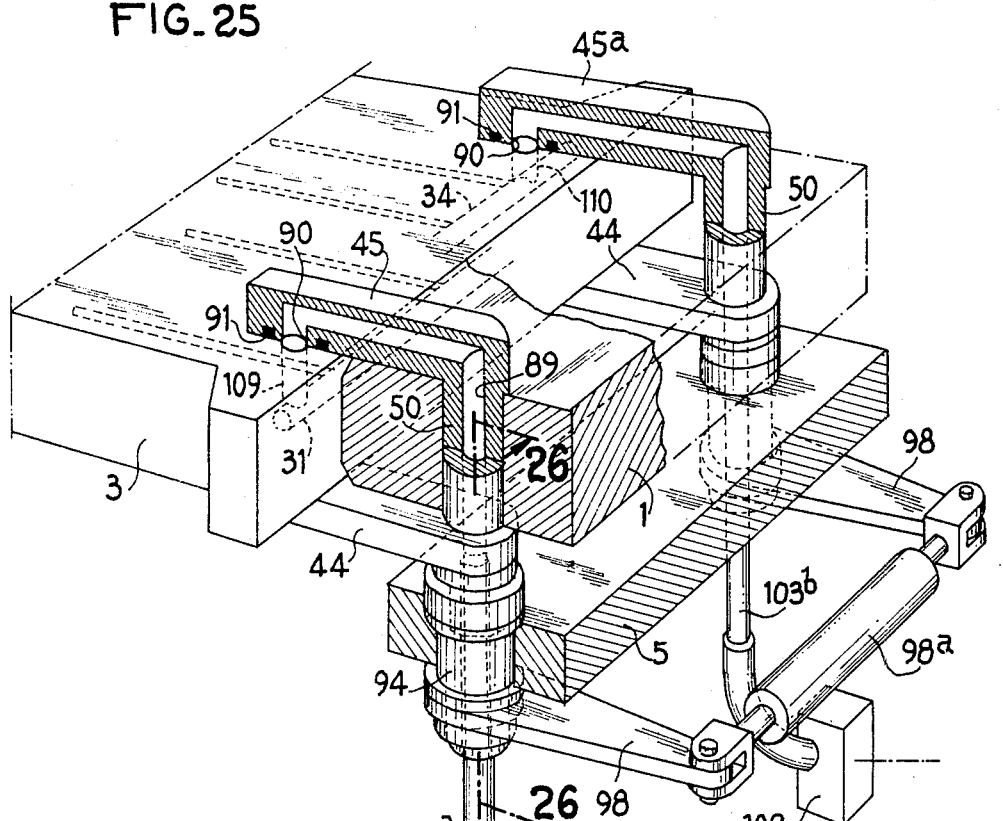
FIG. 25 is a partial perspective view, with parts in section and parts cut away, of a modification of an injection blowing machine according to the invention.
Figure 26:
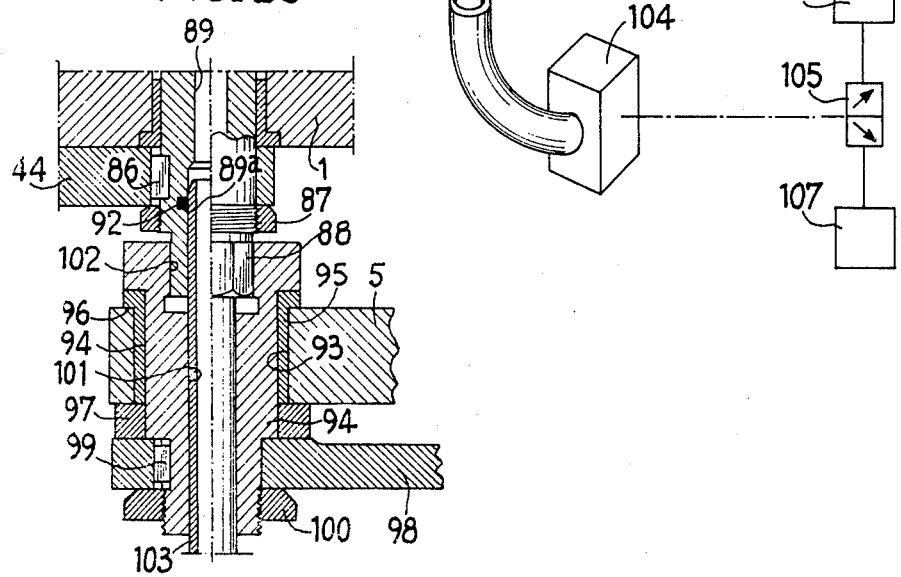
FIG. 26 is a sectional detail view in the plane 26—26 of FIG. 25.
Figure 27:
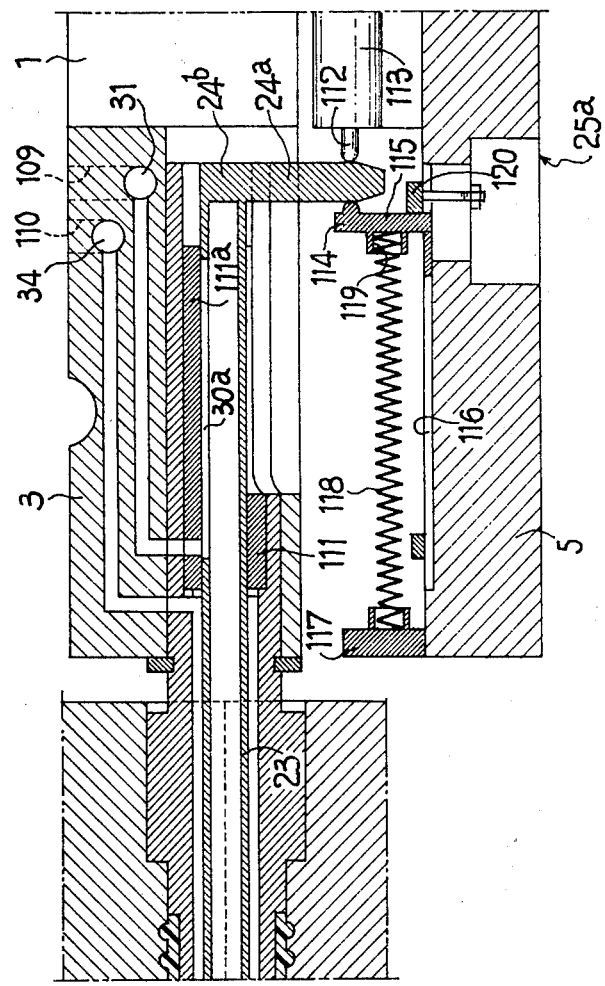
FIG. 27 is a diagrammatic partial sectional view corresponding to FIG. 5, in respect of the machine shown in FIGS. 25 and 26.

The machine illustrated in FIGS. 25-27 is identical to that disclosed hereinbefore in essential respects and its operation in the same. Therefore, in the ensuing description, only the parts of this machine will be described which differ from the corresponding parts of the embodiment shown in FIGS. 1–24 or which advantageously complete the latter.

As can be seen in FIGS. 25 and 26, each pair of upper and lower locks 45 and 44 is integral with a pivot shaft or journal 50 extending vertically through the turret 1. The lower lock is keyed to the shaft 50 by a key 86 and maintained against the lower face of the turret by a screwed nut 87. The lower end 88 of the shaft 50 is shaped externally with six sides or flats. The upper lock 45, which is in one piece with the upper end of this shaft, is in contact with the upper face of the turret 1. The locks 44 and 45 have a rectangular crosssectional shape.

The assembly comprising the lock 45 and shaft 50 is hollow: a conduit 89 extends from the six-sided portion 88 and vertically through the shaft 50, and then horizontally through the lock 45, and opens out vertically at 90 onto the lower face of this lock which projects from the turret in the locking position. Formed around the orifice 90 is a circular groove receiving an O-ring seal 91. The base 89$^a$ of the conduit 89, which has a slightly enlarged diameter, also has an inner groove receiving an O-ring seal 92.

Coaxial with each shaft 50, the table 5 has a circular opening 93 in which there is mounted a rotary bearing 94 provided by an anti-friction ring 95 retained by a shoulder 96. A ring 97 fitted on the ring 94 separates the lower face of the table 5 from a lever 98 keyed at 99 on this bearing and maintained by a nut 100. The two levers 98 of the same side of the turret 1 are shifted simultaneously by their ends owing to the action of a jack 98$^a$ secured to the table 5.

On its axis, the bearing 94 has, extending therethrough, a bore 101 which is enlarged at its upper end into a cavity 102 which has six sides or flats which correspond to the six sides 98. A tube 103 having a chamfered upper end extends through the bore 101 and projects above the end 94. Its outside diameter is equal to the inside diameter of the base 89$^a$ of the conduit 89. When the turret is in the lowered position shown in FIG. 26, the tube 103 almost penetrates through the upper end of this base 89$^a$, the sealing being ensured by the seal 92. The orientation of the six sides 102 and 88 is such that they exactly correspond when viewed in plan when the turret must be lowered, that is to say, when the locks are in the withdrawn position. Consequently, there is an automatic connection of the locks to rotate with the corresponding lever 98 and a fluidtight connection of the conduit 89 to the respective tubes 103 when the turret is lowered by the penetration of the tubes 103 in the bases 89$^a$ with a radial crushing of the seal 93 and by the engagement of the six sides 88 in the cavity 102.

The tube 103$^a$ of the tubes 103 is connected to a cut-off valve 104 and thence to a distributing valve 105 for selective communication with a source of cooling fluid 106 or a source of blowing fluid 107. The other tube 103$^b$ is connected to the atmosphere by a cut-off valve 108.

With respect to the embodiment shown in FIGS. 1-24, and in particular in FIGS. 5 and 6, the set of cores E having a core-carrying bar or plate 3 is modified as shown in FIG. 27. Each of the fluid supply and exhaust manifolds 31 and 34 communicates with the upper face of the plate 3 by way of a vertical conduit 109, 110 respectively. The conduits 109 and 110 have the same diameter as the orifices 90 and are so disposed that, when the locks are in the withdrawn locking position (FIG. 25), these conduits communicate with the orifices 90, the sealing being ensured by the seal 91. Owing to the necessary horizontal offset between the manifolds 31 and 34 (FIG. 27), it should be understood that the lock 45 corresponding to the conduit 110 (reference 45$^a$ in the FIG. 25) is longer than the other.

Instead of being provided with an orifice 30, each hollow rod 23 is provided with an upper longitudinal groove 30$^a$ which is disposed in such manner that it communicates with the fluid supply manifold 31, irrespective of the longitudinal position of the rod 23. The guide bearing 111 of this rod and the upper part of the driving finger member 24$^a$ are of course so shaped as to permit the complete movement of the rod 23 without, however, putting the groove 30$^a$ in communication with the atmosphere. The finger movement 24$^a$ is solid and closes the end of the rod 22 by its upper end 24$^b$ which is constituted by a disc having the same diameter as this rod, and the bearing 111 has, in its upper part, a longitudinal extension 111$^a$.

It will be understood that, by way of a modification, the hollow rods 23 could merely be provided with an aperture 30, as shown in FIGS. 5 and 6, a supply chamber of suitable length being provided in the bearing 111.

The drive fork 24$^a$ comprises a piston rod 112 having a round end pertaining to a double-acting jack 113 secured to the table 5, and a jaw 114 having a rounded active face carried by a drive 115 which is guided in a groove 116 formed in the upper face of the table in the extension of the jack 113. Fixed to the end of the groove 116 is a hollowed-out member 117 receiving one end of a return spring 118. The other end of the latter is received in a cavity 119 in the slide 115. The spring 118 permanently biases the slide 115 toward the right as shown in FIG. 27, this movement being limited by an adjustable stop 120.

The rods 23, and the extensible noses 18 they carry, are controlled in the known manner. When the turret descends, the finger member 24$^a$ places itself between the jaw 114 and the piston rod 112 owing to its convergent lower end portion. As soon as it is supplied with driving fluid, the jack 113 shifts the finger member 24$^a$ to the left, as viewed in FIG. 27, and therefore causes the noses 18 to move outwardly. The jack 113 is in fact a double jack producing two movements of different amplitudes of the finger member 24$^a$ for the pre-blowing and blowing respectively.

Under the action of the spring 118, the jack 114 is constantly maintained applied against the finger member 24$^a$ and eliminates and clearance or play between the latter and the piston rod 112.

In order to withdraw the rod 23 and the nose 18, the supply of fluid to the jack 113 is reversed and this brings the piston rod 112 to its position of departure shown in FIG. 27. The jaw 114 simultaneously causes the return of the finger member 24$^a$ under the action of the spring 118.

The various synchronized and automatic operations of the machine have not been described in detail, since they will be understood by one skilled in the art with the aid of the description of the structure and operation of the machine.

I claim:

1. A machine for continuously manufacturing hollow bodies by injection and blowing of material, comprising in combination, a rotary polygonal-sided turret rotating in a step-by-step manner about an axis, a plurality of turret stations arranged around said axis of the turret and comprising an injection station injecting said material in the form of blanks, a blowing station having means axially stretching and then blowing said material into biaxially oriented hollow bodies, and intermediate stations between said injection station and said blowing station, said intermediate stations including a transfer station, an oven structure having means operable to heat the material to biaxial orientation temperature and being disposed adjacent said transfer station and having a plurality of oven stations moving in step-by-step manner in a closed circuit, a plurality of sets of support members carrying said material in various stages of manufacture of said hollow bodies, each of the sides of the turret receiving a respective one of said sets of support members, each of said oven stations receiving a respective one of said sets of support members, means removably and independently fixing said sets of support members respectively to said turret sides and to said oven stations, the step-by-step rotation of the turret moving each set of support members carried by the turret sides to each one of said turret stations, the step-by-step movement of said oven stations moving each set of support members carried by the oven structure step-by-step in starting at said transfer station and eventually ending at said transfer station, and means transferring the sets of support members at said transfer station from said turret to said oven structure and subsequently from said oven structure to said turret.

2. A machine as claimed in claim 1, wherein each side of the turret is combined with support, fixing and locking means and each station of the oven structure is combined with support, fixing and locking means, each of said sets of support members comprises a plurality parallel pins and a pin-carrying plate on which the parallel pins are carried, each plate being combined with support, fixing and locking means which are cooperative with and complementary to said support, fixing and locking means of the turret and the oven structure.

3. A machine as claimed in claim 2, wherein said fixing means for each set comprise a semi-cylindrical recess in the plate and a rotary lock pin which is semi-cylindrical and has a flat and is carried by the oven structure for engagement with the semi-cylindrical recess.

4. A machine as claimed in claim 2, wherein each of the stations of the oven structure comprises means defining a socket receiving the respective plate, a semi-cylindrical lock pin which is rotatably mounted on the oven structure and has a diametral flat and extends alongside the socket and transversely of the socket in such manner that, when it is the flat which is disposed to face inwardly of the socket, the flat is flush with a wall of the socket and leaves the socket section completely free for receiving the respective plate and, when it is the semi-cylindrical part of the lock pin which is disposed to face inwardly of the socket, the semi-cylindrical part projects into the socket and engages in the recess of the respective plate of a set and locks the set in the socket.

5. A machine as claimed in claim 4, comprising a rotary electromagnet carried by a lateral wall of the oven structure rotating each lock pin.

6. A machine as claimed in claim 4, wherein each socket of the oven structure is defined in an inner end of the socket by at least one adjustable stop which extends through a wall of the socket.

7. A machine as claimed in claim 6, wherein said stop is constituted by a set-screw which has a conical point and extends through a lateral wall of the socket into the socket.

8. A machine as claimed in claim 1, wherein each of said sets comprises a plate carrying said support members, and said oven stations are each constituted by means defining a socket receiving the respective plate, and each side of the turret is combined with said fixing means for the turret to define a cavity for receiving the respective plate.

9. A machine as claimed in claim 8, wherein each fixing means comprises two heels on each plate bearing against the respective side of the turret and two lateral clamping jaws respectively clamping the heels against the side of the turret.

10. A machine as claimed in claim 9, wherein one of the heels has an inclined face which tapers the heel and the corresponding jaw has a corresponding inclined face clampingly engaging the inclined face of the heel.

11. A machine as claimed in claim 1, wherein the oven structure and the oven stations are rotatable about an axis, and sockets in the oven structure define the oven stations for receiving said sets of support members, the oven structure comprising an axial tubular manifold receiving hot air and sets of parallel radial tubular branches leading from the manifold to the sockets, the number of branches being equal to the number of support members in each set, each branch receiving a respective support member carrying said material for heating said material.

12. A machine as claimed in claim 11, comprising a flexible tubular hot air-blowing duct and a rotary joint connecting the duct to the axial manifold.

13. A machine as claimed in claim 1, wherein the oven stations are capable of stopping in turn in a general plane of the turret at said transfer station, the oven structure being reciprocatable in a direction parallel to said general plane of the turret for transferring said sets of support members between the turret and the oven structure.

14. A machine as claimed in claim 13, comprising bearing means rotatively supporting the oven structure which is rotatable about an axis containing said general plane of the turret, slideway means for supporting said bearing means and jack means connected to said bearing means for reciprocating said bearing means when transferring said sets of support members.

15. A machine for continuously manufacturing hollow bodies by injection and blowing of material, comprising in combination, a rotary polygonal-sided turret rotating in a step-by-step manner about a vertical axis, a plurality of turret stations arranged around said vertical axis of the turret and comprising an injection station injecting said material in the form of blanks, a blowing station having means axially stretching and then blowing said material into biaxially oriented hollow bodies, and intermediate stations between said injection station and said blowing station, said intermediate stations including a transfer station, an oven structure having means operable to heat the material to biaxial orientation temperature and being disposed adjacent said transfer station and having a plurality of oven stations moving in step-by-step manner in a closed circuit, a plurality of sets of support members carrying said material in various stages of manufacture of said hollow bodies, each of the sides of the turret receiving a respective one of said sets of support members, each of said oven stations receiving a respective one of said sets of support members, means removably and independently fixing said sets of support members respectively to said turret sides and to said oven stations, the step-by-step rotation of the turret moving each set of support members carried by the turret sides to each one of said turret stations, the step-by-step movement of said oven stations moving each set of support members carried by the oven structure step-by-step in starting at said transfer station and eventually ending at said transfer station, and means transferring of the sets of support members at said transfer station from said turret to said oven structure and subsequently from said oven structure to said turret, each of said sets comprising a plate carrying said support members, and said oven stations being each constituted by means defining a socket receiving the respective plate and each side of the turret being combined with said fixing means for the turret to define a cavity receiving the respective plate, said fixing means fixing each set to the side of the turret comprising on a top face and a bottom face of the turret pairs of upper locks and lower locks which are mounted to be rotatable in a horizontal plane on said top and bottom faces of the turret between a withdrawn position within the periphery of the turret and a locking position in which they project from the corresponding side of the turret, and lateral clamping jaws clamping the plate to the side of the turret.

16. A machine as claimed in claim 15, wherein the turret is movable up and down in translation in a direction parallel to the axis of rotation of the turret, and the machine further comprises, in respect of each side of the turret, two of said pairs of upper and lower locks, a pivot shaft mounted on the turret carrying each of the pairs of upper and lower locks, means driving each pivot shaft in rotation, and an end member integral with a lower end of each pivot shaft for an automatic connection, in a lowered position of the turret, to the pivot shaft driving means.

17. A machine as claimed in claim 16, wherein each end member has a polygonal cross section and is received, in the lowered position of the turret, in a cavity of corresponding shape in the corresponding pivot shaft driving means.

18. A machine as claimed in claim 15, comprising elastically yieldable return means biasing each lateral clamping jaw against the respective side of the turret, a push-member engaging the clamping jaw and an eccentric having an axis of rotation perpendicular to the turret and cooperative with the push-member for shifting the clamping jaw away from the respective heel in opposition to the action of the elastically yieldable means.

19. A machine as claimed in claim 18, wherein a bolt which is fixed to the turret and has an axis perpendicular to said axis mounts each lateral clamping jaw on the turret, the jaw being slidable on the bolt.

20. A machine as claimed in claim 18, comprising a linkage driving the eccentric and each pair of locks simultaneously in rotation.

21. A machine as claimed in claim 20, comprising means actuating simultaneously the linkages pertaining to the side of the turret located adjacent the oven structure.

22. A machine for continuously manufacturing hollow bodies by injection and blowing of material, comprising in combination a rotary polygonal-sided turret rotating in a step-by-step manner about an axis, a plurality of turret stations arranged around said axis of the turret and comprising an injection station injecting said material in the form of blanks, a blowing station having means axially stretching and then blowing said material into biaxially oriented hollow bodies, and intermediate stations between said injection station and said blowing station, said intermediate stations including a transfer station, an oven structure having means operable to heat the material to biaxial orientation temperature and being disposed adjacent said transfer station and having a plurality of oven stations moving in step-by-step manner in a closed circuit, a plurality of sets of support members carrying said material in various stages of manufacture of said hollow bodies, each of the sides of the turret receiving a respective one of said sets of support members, each of said oven stations receiving a respective one of said sets of support members, means removably and independently fixing said sets of support members respectively to said turret sides and to said oven stations, the step-by-step rotation of the turret moving each set of support members carried by the turret sides to each one of said turret stations, the step-by-step movement of said oven stations moving each set of support members carried by the oven structure step-by-step in starting at said transfer station and eventually ending at said transfer station, and means transferring of the sets of support members at said transfer station from said turret to said oven structure and subsequently from said oven structure to said turret, each of said sets comprising a plate carrying said support members, and said oven stations being each constituted by means defining a socket receiving the respective plate and each side of the turret being combined with said fixing means for the turret to define a cavity receiving the respective plate, each of said sets further comprising a finger member associated with a fork mounted on the turret shifting the finger member in translation, each support member being hollow and having a hollow rod extending through the support member with annular clearance, a nose carried by an end of the hollow rod, the finger member being connected to the hollow rod to move the hollow rod in translation relative to the support member and thereby shift the nose away from the end of the support member, means defining an exhaust manifold and a fluid supply manifold in the support plate, which supply manifold is connected to a source of support member-cooling fluid, said exhaust manifold permanently communicating with said annular spaces in said support members.

23. A machine as claimed in claim 22, wherein the finger member is hollow and serves as a blowing fluid conduit and communicates with the hollow rods, said finger member being capable of being connected to a source of blowing fluid under pressure, the fluid supply manifold communicating with said hollow rods solely in a withdrawn position of said rods in which the noses are not shifted away from the ends of the support members.

24. A machine as claimed in claim 22, comprising a longitudinal passage which permanently puts said hollow rods in communication with the fluid supply manifold, and means for selectively connecting said fluid supply manifold to the source of cooling fluid and the source of blowing fluid.

25. A machine as claimed in claim 22, wherein the supply manifold and exhaust manifold have inlet orifices and the fixing means for fixing each set of support members to the respective side of the turret comprise clamping jaws and pairs of upper locks and lower locks, which locks are mounted on opposite faces of the turret and are capable of engaging opposite faces of the respective plate, two locks on one of the faces of the turret being hollow and communicating in a sealed manner, in a locking position of the locks, with the inlet orifice of the supply manifold and the inlet orifice of the exhaust manifold respectively, one of said two locks being capable of being connected selectively with the source of cooling fluid and the source of blowing fluid and the other of said two locks being connected to the atmosphere.

26. A machine as claimed in claim 25, wherein the turret is movable up and down in translation in a direction parallel to the axis of rotation of the turret and a pivot shaft mounted on the turret carries each of said pairs of locks, the machine further comprising means rotating each pivot shaft and an end member integral with a lower end of each pivot shaft for automatic connection in a lowered position of the turret to the pivot shaft driving means, on each side of the turret, the two pivot shafts of said pairs of locks veing hollow and the two respective pivot shaft driving means being hollow, said driving means being respectively connected to a fluid supply conduit and an exhaust conduit.

* * * * *